United States Patent
Le et al.

(10) Patent No.: US 6,446,160 B1
(45) Date of Patent: Sep. 3, 2002

(54) MULTI-DRIVE DATA STORAGE SYSTEM WITH ANALYSIS AND SELECTED DEMOUNTING OF IDLE DATA STORAGE MEDIA

(75) Inventors: Cuong Minh Le; Jerry Wayne Pence, both of Tucson; James Mitchell Ratliff, Benson, all of AZ (US)

(73) Assignee: International Business Machines Corporation, Armonk, CA (US)

( * ) Notice: Subject to any disclaimer, the term of this patent is extended or adjusted under 35 U.S.C. 154(b) by 132 days.

(21) Appl. No.: 09/672,072

(22) Filed: Sep. 28, 2000

(51) Int. Cl.$^7$ .......................... G06F 12/00; G06F 11/00
(52) U.S. Cl. .................. 711/112; 711/111; 711/162; 710/17; 710/18; 700/214; 369/30.32; 714/6
(58) Field of Search .................... 711/112, 111, 162, 711/117, 114; 710/17, 18, 40; 700/214; 369/30.32; 714/6

(56) References Cited

U.S. PATENT DOCUMENTS

| | | | |
|---|---|---|---|
| 4,200,928 A | 4/1980 | Allan et al. | 711/114 |
| 4,638,424 A | 1/1987 | Beglin et al. | 711/117 |
| 4,771,375 A | 9/1988 | Beglin et al. | 711/111 |
| 4,876,662 A | 10/1989 | Pence | 365/78 |
| 5,012,415 A | 4/1991 | Boe et al. | 701/50 |
| 5,121,483 A * | 6/1992 | Monahan et al. | 365/189.05 |
| 5,197,055 A | 3/1993 | Hartung et al. | 369/30.32 |
| 5,274,799 A | 12/1993 | Brant et al. | 714/6 |
| 5,278,970 A | 1/1994 | Pence | 710/68 |
| 5,311,424 A | 5/1994 | Mukherjee et al. | 705/29 |
| 5,353,422 A | 10/1994 | Kobayashi et al. | 711/170 |
| 5,402,101 A | 3/1995 | Berger et al. | 340/286.02 |
| 5,418,971 A | 5/1995 | Carlson | 710/24 |
| 5,426,585 A | 6/1995 | Steppe et al. | 702/85 |
| 5,440,686 A | 8/1995 | Dahman et al. | 345/537 |
| 5,522,090 A | 5/1996 | Tanaka et al. | 710/74 |
| 5,546,557 A | 8/1996 | Allen et al. | 711/111 |
| 5,566,348 A | 10/1996 | Dahman et al. | 710/18 |
| 5,603,003 A | 2/1997 | Akizawa et al. | 711/114 |
| 5,613,082 A | 3/1997 | Brewer et al. | 711/4 |
| 5,646,918 A | 7/1997 | Dimitri et al. | 369/30.31 |
| 5,740,061 A | 4/1998 | Dewey et al. | 700/214 |
| 5,826,043 A | 10/1998 | Smith et al. | 710/303 |
| 5,911,150 A | 6/1999 | Peterson et al. | 711/162 |
| 5,966,730 A | 10/1999 | Zulch | 711/162 |
| 5,970,147 A | 10/1999 | Davis | 713/172 |
| 5,980,078 A | 11/1999 | Krivoshein et al. | 700/1 |
| 5,995,960 A | 11/1999 | Lochner et al. | 707/3 |
| 5,999,030 A | 12/1999 | Wolff | 707/8 |
| 6,336,187 B1 * | 1/2002 | Kern et al. | 713/161 |

OTHER PUBLICATIONS

"Sort Process for Migration—Storage to Optical Versus RTape" IBM Technical Disclosure Bullletin, vol. 36 No. 10, Oct. 1993.

"Selectable Migration for Exportikng Optic al Media" IBM Technical Disclosure Bulletin, vol. 37 No. 06A, Jun. 1994.

"Recalling Migrated Data Sets" IBM Technical Disclosure Bulletin, vol. 26 No. 9, Feb. 1984.

"Automated Cartridge Disposition Promotion (Unload–Least Recently Used to KEEP)" IBM Technical Disclosure Bulletin, vol. 36 No. 08, Aug. 1993.

* cited by examiner

*Primary Examiner*—Hong Kim
(74) *Attorney, Agent, or Firm*—Dan Hubert & Assoc.

(57) ABSTRACT

In a data storage system that employs multiple storage drives to access removable data storage media, idle data storage media are analyzed and than selectively demounted by automated equipment to increase storage drive availability and also minimize unnecessary mount/demount operations. Initially, the system establishes a maximum permitted number of concurrently mounted idle storage media, and also establishes a maximum permitted length of time for leaving idle storage media mounted. Next, storage media mounted to the media drives are analyzed for possible demounting. The system determines how many storage media are presently mounted, and each media's mount time. Then, the system identifies suitable demounting candidates (if any) to comply with the established maximums. Namely, the system identifies the media with the greatest idle times whose demounting is necessary to both (1) reduce the number of concurrent mounts down to the maximum permitted number, and (2) demount any storage media with idle times exceeding the maximum permitted length of time..

23 Claims, 5 Drawing Sheets

MULTI-DRIVE DATA STORAGE SYSTEM WITH ANALYSIS AND SELECTED DEMOUNTING OF IDLE DATA STORAGE MEDIA

BACKGROUND OF THE INVENTION

1. Field of the Invention

The present invention relates to data storage systems that use removable data storage media. More particularly, the invention includes a data backup system that employs multiple storage drives for accessing removable data storage media, where idle data storage media are analyzed and selectively demounted to increase availability of the storage drives and also minimize unnecessary mount/demount operations.

2. Description of the Related Art

With the increasing importance of electronic information today, there is a similar increase in the importance of reliable data storage. The market abounds with different means of data storage today, ranging from high-speed, more expensive products such as random access memory (RAM), to slower speed, less expensive products such as magnetic tape. Once consumers recognize the importance of reliably storing data, many also recognize the critical value of backup storage, in case the stored data is lost through accident, device failure, catastrophe, etc.

Magnetic tape is one of the most popular types of backup storage media because of its large storage capacity and affordability. In the early days of backup technology, magnetic tape backup operations were performed in "batch" style. Namely, the tape storage system was loaded with one or more tapes in the late evening or another convenient backup time, and the storage system was invoked to copy all source data to tape backup.

More recently, consumers have favored "event-driven" backups, which are backups of smaller datasets performed during ongoing operation of the storage system instead of consolidating backup operations at pre-arranged "batch" times. Event-driven backups are triggered by particular events, such as arrival of a particular time, commencement of a data storage transaction, user request, or any other pertinent storage or processing event. One example of an event-driven backup is a periodic auto-save operation. Another example is the backup storage of a bank account record before completing a new transaction, in order to preserve the ability to restore the bank account record to its previous state in case that new transaction fails. In some cases, event-driven backups are achieved using a single tape mounted to a single tape drive. In other cases, larger event-driven backups can be performed by storing data to multiple tapes in parallel, by using multiple tape drives concurrently.

Unlike batch backups, where the storage system is copied en masse during a lengthy backup session, event-driven backups present greater challenges from the standpoint of tape management. Particularly, tapes can reside in their tape drives for a long time because backup data arrives relatively slowly, making it difficult to completely fill a tape. Event-driven backup requests also present a bursty, unpredictable data arrival pattern that can make planning difficult.

Another challenge with event-driven backups is minimizing mount/demount overhead. If tapes containing a backup dataset are already mounted when a backup event occurs, the backup can be performed without any mount/demount overhead. Therefore, there is some incentive to leave tapes mounted where possible. However, if tapes are permitted to remain mounted after use, and the next backup event does not concern these tapes, additional overhead is incurred by having to mount the proper tapes.

Accordingly, backup storage engineers are faced with numerous tape management challenges. Decisions must be made as to which tapes to demount and which tapes to leave mounted in order to provide the most efficient possible backup strategy. One consequence of an efficient backup strategy includes the cost of having a human or machine operator perform an excessive number of tape mounts and demounts. Inefficient backup strategies can also frustrate storage system users with delays that occur while backup tapes are located and mounted.

There have been some previous approaches to the problems presented by event-driven backups. One such approach accumulates backup data in a magnetic disk drive storage queue, and then offloads the backup data to tape in response to demand, time schedule, etc. Another approach accumulates backup data in a circuit memory queue, and then downloads memory to tape whenever an entire tape's worth of data has accumulated in memory. The foregoing approaches have certain advantages from the standpoint of minimizing tape mount-demount operations. However, these techniques increase hardware costs by requiring additional disk drive or memory storage. Also, these techniques may not provide adequate disaster protection for some applications, since they are acutely vulnerable to the failure of the disk drive or memory storage queues.

Consequently, due to these and other unsolved problems, the state of the art in event-driven backup technology may not be completely satisfactory for some applications. Moreover, engineers at International Business Machines Corp. (IBM) are continually seeking improvements in the performance and efficiency of tape backup systems.

SUMMARY OF THE INVENTION

The present invention is implemented in a data backup system that employs multiple storage drives for accessing removable data storage media, where idle data storage media are analyzed and selectively demounted to increase availability of the storage drives and also minimize unnecessary mount/demount operations. The backup system is initialized by establishing a maximum number of permissible concurrently mounted idle storage media, and also establishing a maximum time for leaving idle storage media mounted. After initialization, storage media mounted to the media drives are analyzed for possible demounting. The system determines how many storage media are presently mounted, and each media's mount time. Then, the system identifies suitable demounting candidates (if any) to comply with the established maximums of concurrent mounts and mounting time. Namely, the system identifies the media with the greatest mount times whose demounting is necessary to both (1) reduce the number of concurrent mounts down to the maximum number, and (2) demount any storage media with excessive mount times. Advantageously, the maximum number of concurrent mounts and the maximum idle time may be adjusted "on the fly," such that the system recognizes and promptly honors the new parameters. As another additional feature, storage media with excessive idle mount times may be logically interchanged with emptier storage media, where the emptier storage media is demounted instead of the media with excessive idle mount time. This helps to thoroughly fill older storage media with data, avoiding premature and costly utilization of new, empty storage media.

The foregoing features may be implemented in a number of different forms. For example, the invention may be implemented to provide a method of operating a backup data storage system, as discussed above. In another embodiment, the invention may be implemented to provide an apparatus such as a backup data storage system. In still another embodiment, the invention may be implemented to provide a signal-bearing medium tangibly embodying a program of machine-readable instructions executable by a digital data processing apparatus to operate a backup data storage system as shown herein. Another embodiment concerns logic circuitry having multiple interconnected electrically conductive elements configured to operate a backup data storage system as depicted herein.

The invention affords its users with a number of distinct advantages. For example, the invention avoids excessive mount/demount operations by carefully analyzing characteristics of the presently mounted storage media. Moreover, the invention encourages faster completion of storage operations for a number of different reasons. First, the invention increases the likelihood that some storage drives are available for new media, since the number of concurrent mounts is limited to a maximum number. Second, the invention increases the likelihood that required storage media are already mounted to storage drives and ready to conduct read/write operations because the less-idle media are retained and more-idle media are demounted. Additionally, the invention supports disaster recovery by promptly writing data to tape backup rather than pooling data in a vulnerable, intermediate storage media such as circuit memory or disk drive storage. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Figure 1:
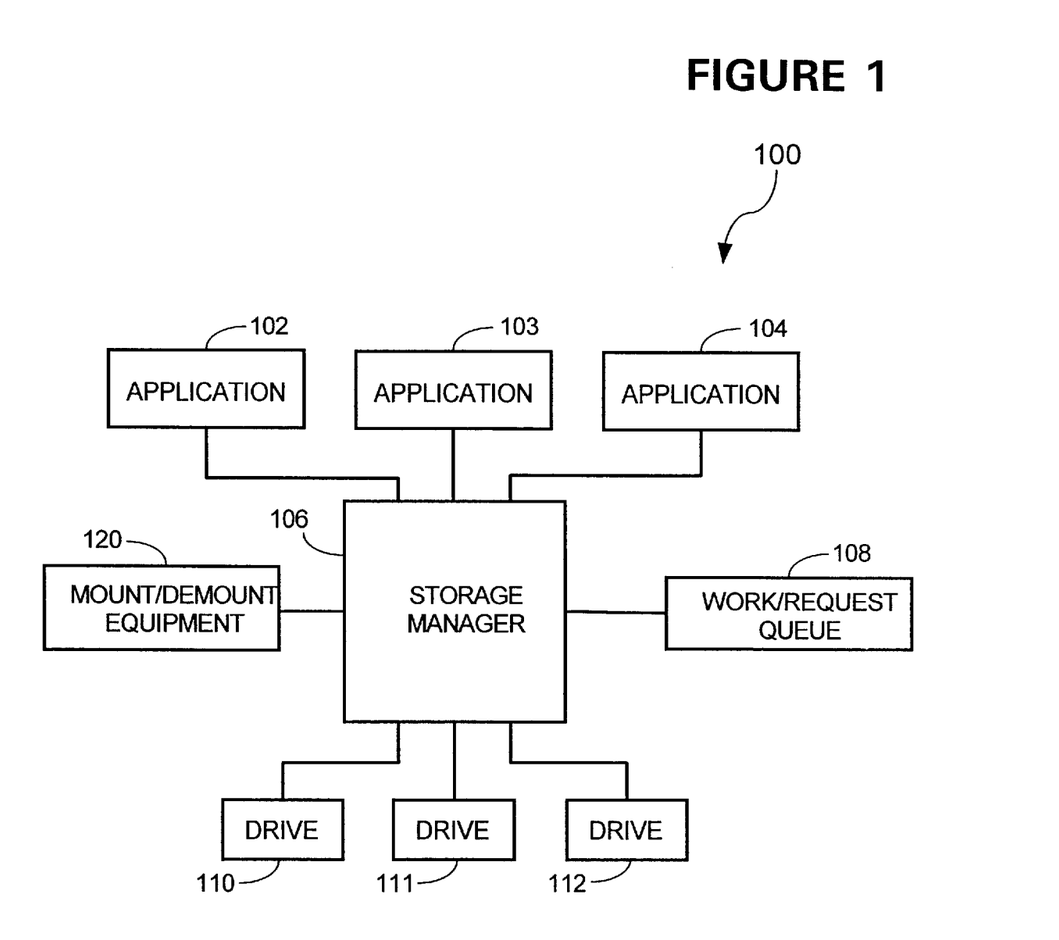
FIG. 1 is a block diagram of the hardware components and interconnections of a backup storage system according to the invention.

One aspect of the invention concerns a backup storage system, which may be embodied by various hardware components and interconnections, with one example being described in FIG. 1. The backup storage system 100 includes one or more applications 102–104, although a greater or lesser number may be used. The applications 102–104 comprise application software programs, computer workstations, servers, personal computers, mainframe computers, manually activated operator terminals, or other host processes. In one example, the applications 102–104 represent customers' application programs that utilize backup storage provided by the system 100.

The applications 102–104 are coupled to a storage manager 106, which comprises computer-driven equipment capable of managing operations of multiple storage drives 110–112. The storage manager 106 may be implemented by a variety of different hardware devices, such as a personal computer, server, computer workstation, mainframe computer, etc. Furthermore, the storage manager 106 may even share common hardware with one or more of the applications 102–104. As a specific example, the storage manager 106 may comprise a commercially available product such as an IBM brand Data Facility Storage Management Subsystem Hierarchical Storage Manager ("DFSMShsm") product. The storage manager 106 is coupled to a work/request queue 108, which comprises one or more digital data storage devices that may be provided separately from the storage manager 106, or integrated therewith. The work/request queue 108 may store jobs originating from the applications 102–104, processes internal to the storage manager 106, or a combination of both.

Each of the storage drives 110–112 comprise an electronic machine to conduct read/write operations with a storage medium in removable attachment to the storage drive. As one example, the drives 110–112 may comprise magnetic tape drives such as IBM model 3590-E1A tape drives. In this example, the storage media comprise removable magnetic tape units housed in cartridges.

The system 100 may also include mount/demount equipment 120. The equipment 120 serves to mount tapes into the drives 110–112 and demount tapes from the drives 110–112. In one example, such equipment may be provided by separate cartridge loaders or other equipment local to each drive. In another example, the equipment 120 may be provided by a robotic arm or other component with universally access to all drives 110–112. In still another alternative, a human operator may be employed to carry out tape mount/demount operations.

Exemplary Digital Data Processing Apparatus

As mentioned above, the storage manager 106 may be implemented in various forms. As one example, the storage manager 106 may comprise a digital data processing apparatus, as exemplified by the hardware components and interconnections of the digital data processing apparatus 200 of FIG. 2.

Figure 2:
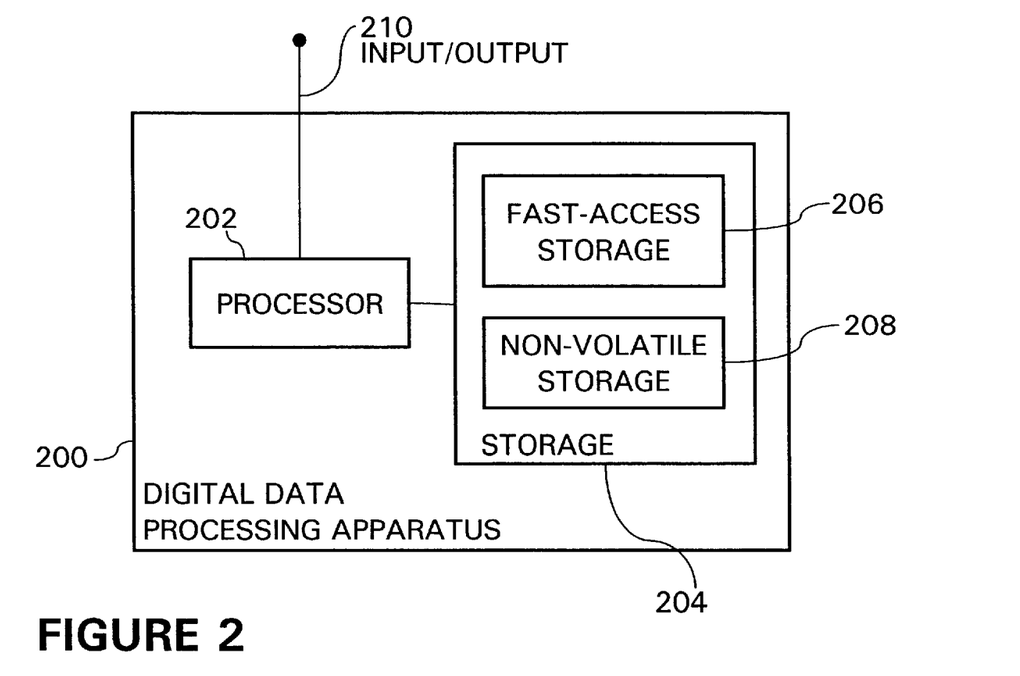
FIG. 2 is a block diagram of a digital data processing machine according to the invention.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200. Despite the specific foregoing description, ordinarily skilled artisans (having the benefit of this disclosure) will recognize that the apparatus discussed above may be implemented in a machine of different construction, without departing from the scope of the invention. As a specific example, one of the components 206,208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the storage manager 106. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the method aspect of the present invention will now be described. Although the present invention has broad applicability to digital data storage systems, the specifics of the structure that has been described is best suited for tape backup storage systems, and the explanation that follows will emphasize such an application of the invention without any intended limitation.

Signal-Bearing Media

In the context of FIG. 1, such a method may be implemented, for example, by operating the storage manager 106, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to analyze and selectively demount removable backup storage media to selectively demounted to increase availability of the storage drives and also minimize unnecessary mount/demount operations.

Figure 3:
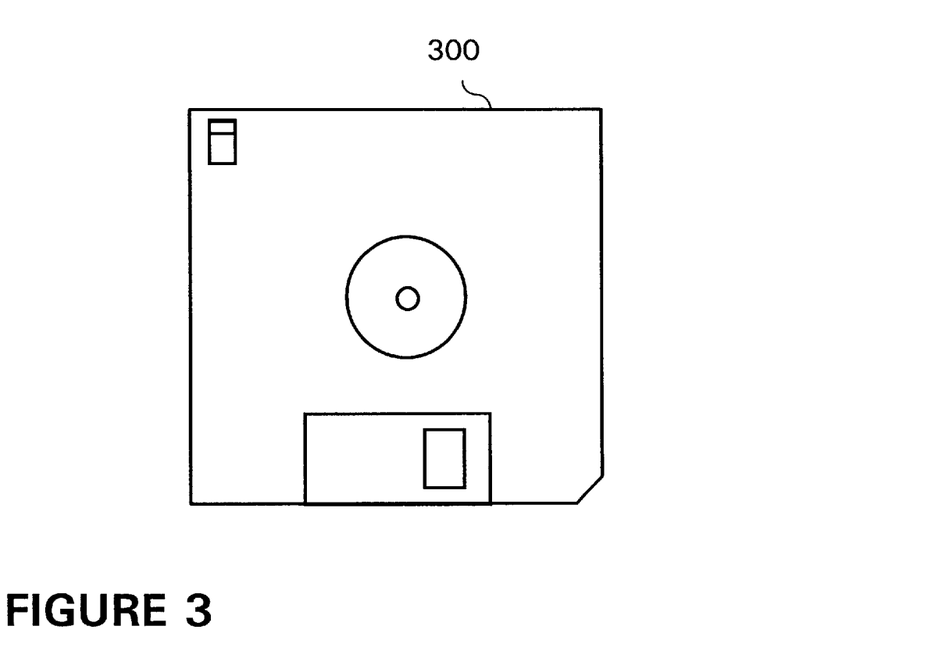
FIG. 3 shows an exemplary signal-bearing medium according to the invention.

This signal-bearing media may comprise, for example, RAM (not shown) contained within the storage manager 106, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the storage manager 106, and is configured to perform operations to implement the method of the invention. The logic circuitry may be implemented using many different types of circuitry, as discussed above.

Overall Sequence of Operation

Figure 4:
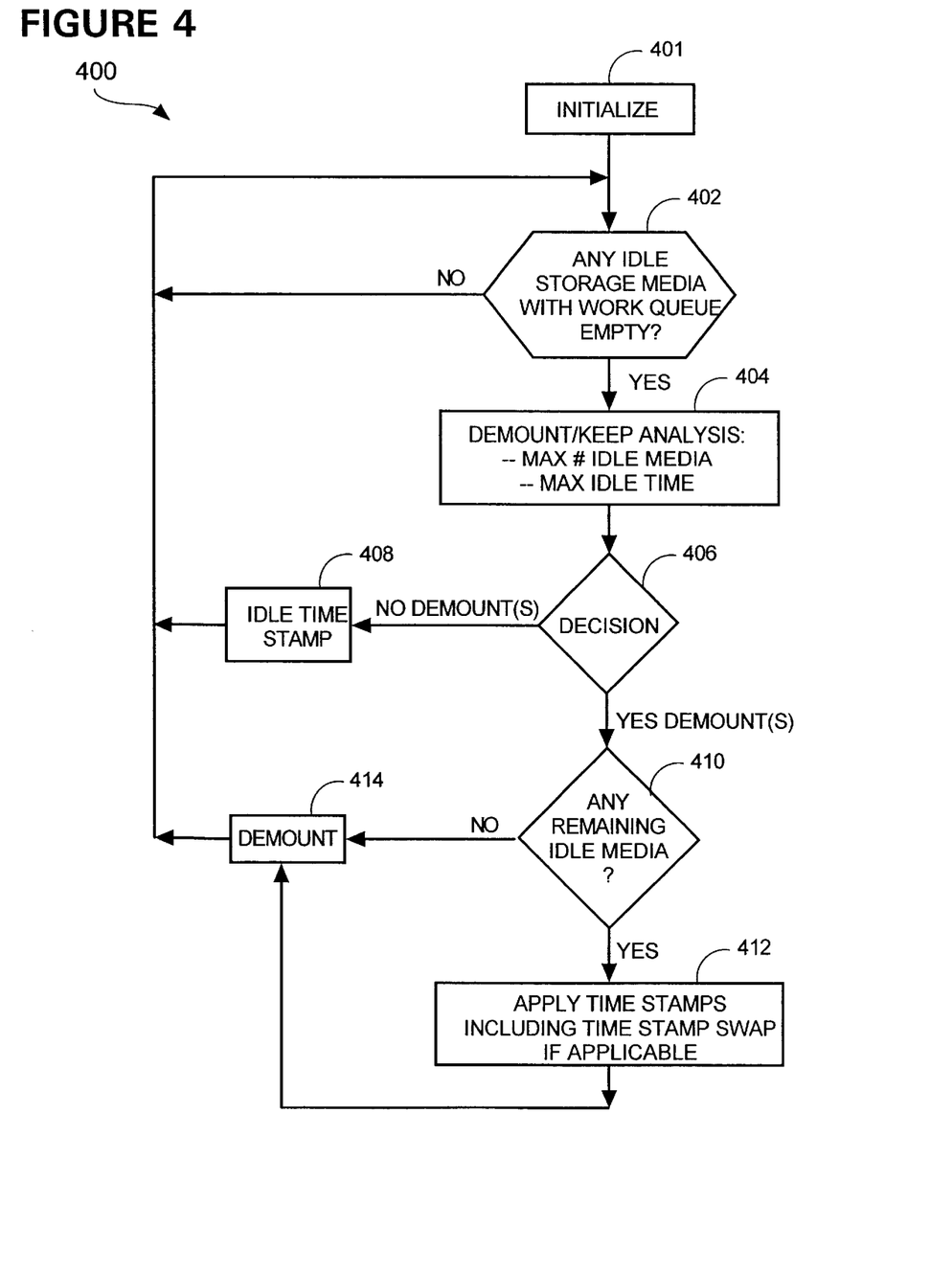
FIG. 4 is a flowchart of an operational sequence for analyzing and selectively demounting removable backup storage media according to the invention.

FIG. 4 shows a sequence 400 to illustrate one example of the method aspect of the present invention. For ease of explanation, but without any intended limitation, the example of FIG. 4 is described in the context of the backup storage system 100 described above. Broadly, the sequence 400 concerns a method for managing removable storage media in a data backup system including multiple media drives. Advantageously, idle data storage media are analyzed and selectively demounted to increase availability of the storage drives and also minimize unnecessary mount/demount operations.

The sequence 400 begins in step 401, where the system 100 is initialized regarding idle storage media treatment. Namely, standards are set as to when a storage medium qualifies as "idle." For example, a storage medium is considered to be "idle" if it is not presently involved in any data access operations, such as Reads and Writes. To help prevent premature analysis of intermittently or temporarily idle storage media, "idle" status may require storage media to be free from read/write access for a predetermined time, such as one minute, ten minutes, one hour, or another predefined time. Also in step 401, a decision is made as to the maximum number of permissible, concurrently mounted idle storage media. Further, step 401 also establishes a maximum time for leaving idle storage media mounted. As one example, the foregoing decisions may be made and implemented by a system administrator or other suitable personnel.

Advantageously, the storage manager 106 is programmed such that the initialization step 401 may be repeated in order to change any of the initialized parameters, such as the definitions of idle time, maximum number of concurrently mounted idle storage media, maximum idle mount time, etc. As an additional, or alternative feature, the storage manager 106 may be reprogrammed "on the fly" by updating the stored values of the foregoing parameters after the initialization step 401 or instead of it.

After step 401, the storage manager 106 asks whether there are one or more storage media residing in drives 110–112 that are presently "idle" (as previously defined), and lack any pending jobs in the work/request queue 108 (step 402). This operation may be initiated according to various schedules, such as periodically, non-periodically, interrupt-driven, or another suitable basis. The condition of the work/request queue 108 being empty for a storage medium means that there are not any pending requests to write data to the storage media or read data from the storage media.

Figure 5:
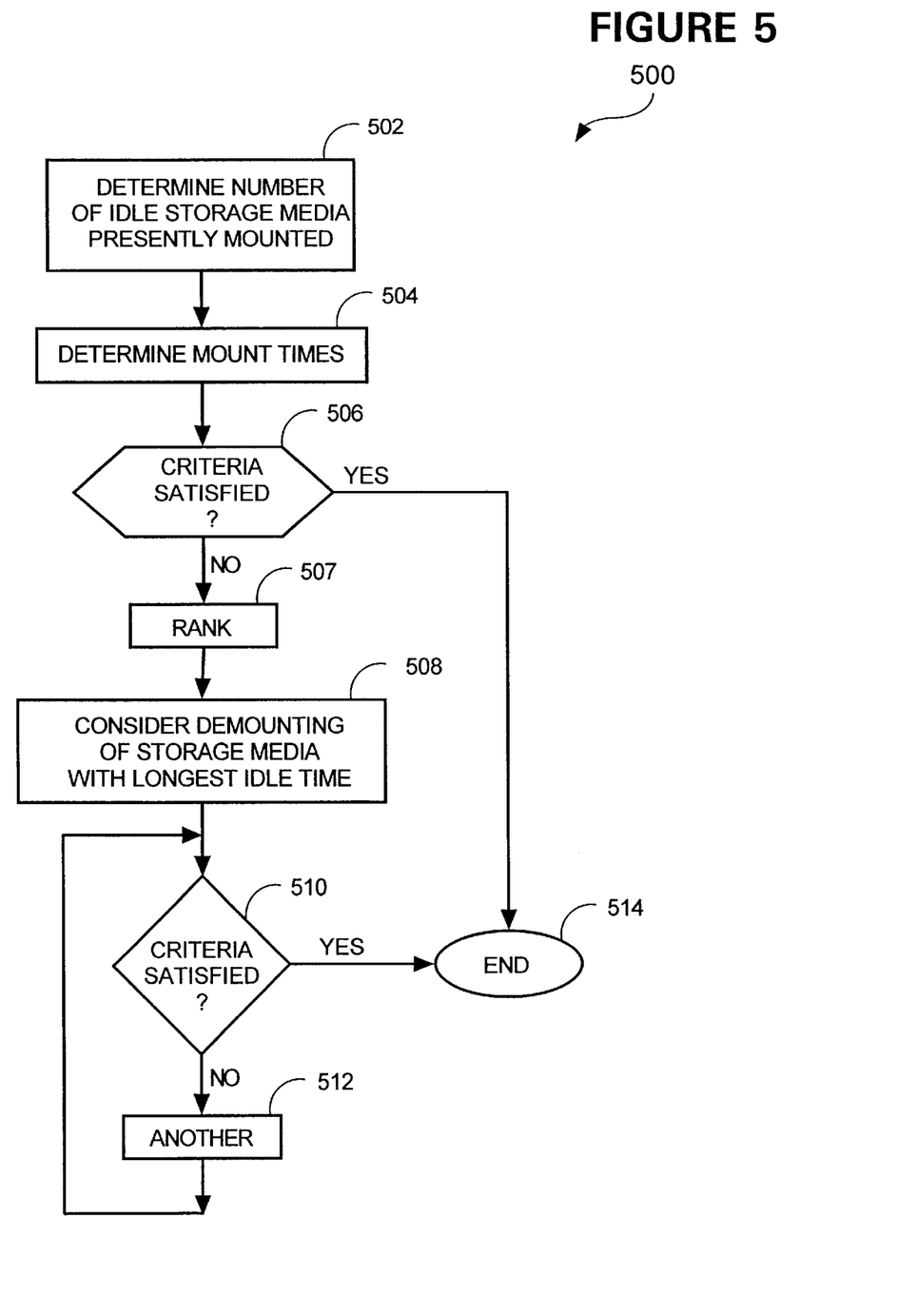
FIG. 5 is a detailed flowchart of one exemplary sequence for analyzing removable backup storage media according to the invention.

If step 402 does not identify any idle storage media without any pending work, the inquiry of step 402 is performed again at another appropriate time. If step 402 does identify any suitable storage media, however, step 402 advances to step 404. In step 404, the storage manager 106 conducts a demount/keep analysis, which considers each storage medium identified in step 402 and determines whether to demount that storage media or leave it mounted to its respective drive 110–112. Step 404 implements a demount/keep criteria that limits the number of concurrently idle storage media to the predetermined maximum (set in step 401), and also demounts any storage media that have been idle for the maximum time (also set in step 401). Step 404 may operate in numerous different ways to implement the foregoing criteria, one example of which is shown below by the sequence 500 (FIG. 5). Completion of step 404 provides the storage manager 106 with a list of presently mounted storage media slated for demounting (if any).

After step 404, the storage manager 106 advances to step 406, which routes control to steps 408 or 410 depending upon the results of step 404. More particularly, the storage manager 106 routes control to step 410 if the analysis of step 404 identified any storage media to demount, and otherwise to step 408. In step 408, the storage manager 106 designates a time stamp for newly idle storage media. The idle time stamp contains a representation of the current time, which is used to indicate when the storage media became idle. For storage media that already have a time stamp, step 408 is omitted because the earlier time stamp already indicates when that storage media became idle. Depending upon the needs of the application, time stamps may be stored in the storage manager 106, on the storage media themselves, a off-site location, or another facility. After step 408, the program 400 returns to step 402.

As mentioned above, step 410 is performed instead of step 408 in case step 404 identified any storage media to demount. In step 410, the storage manager 106 asks whether, after demounting of the storage media identified in step 404, the drives 110–112 will still contain any idle storage media. If not, then the storage manager 106 proceeds to step 414, where directions are given to the mount/demount equipment 120 to demount the storage media slated for demounting in step 404. On the other hand, an affirmative answer to step 410 leads to step 412. Namely, if there will be any remaining idle storage media after demounting the media identified in step 404, step 412 designates time stamps for any of the idle media that do not already have a time stamp.

Optionally, step 412 may also perform one or more "time stamp swaps" if applicable. Each time stamp swap operation examines a storage media slated for demounting, and compares the amount of empty space in that storage media to other idle storage media that have not been slated for demounting. If there is another storage medium (not slated for demounting) that is fuller than the medium under examination, then (1) the time stamps of these two media are swapped, (2) the medium under examination is not demounted, and (3) the time stamp swapping partner of the media under examination is designated for demounting. In this way, the storage manager 106 encourages demounting of fuller storage media, since more active but relatively full storage media are demounted in favor of keeping idle but relatively empty storage media. This approach also encourages data safekeeping by removing fuller tapes that are more vulnerable to data loss.

As an alternative approach, time stamp swaps may be performed to reduce tape mount/demount operations rather than ensure data safekeeping. Under this approach, each time stamp swap operation still examines a storage media slated for demounting, and compares the amount of empty space in that storage media to other idle storage media that have not been slated for demounting. However, if there is another storage medium (not slated for demounting) that is emptier than the medium under examination, then (1) the time stamps of these two media are swapped, (2) the medium under examination is not demounted, and (3) the time stamp swapping partner of the media under examination is designated for demounting. In this way, the storage manager 106 encourages demounting of emptier (but more active) storage media in order to more completely fill the fuller (but less active) storage media, and thereby avoid future mount/demount operations needed to re-mount partially-filled storage media to write more data.

After step 412, the routine 400 progresses to step 414, which demounts the storage media identified in step 404 (or step 412 if swapping was performed) as discussed above. From step 414, the routine 400 returns to step 402, also discussed above.

Demount/Keep Analysis-One Example

As mentioned above, the analysis of step 404 may be implemented in various ways. The sequence 500 (FIG. 5) illustrates one example of steps to implement the demount/keep decision. In this example, these steps are performed by the storage manager 106. Steps 502, 504 determine the number of presently mounted idle storage media, and the mount times of each presently mounted, idle storage medium. Next, step 506 determines whether the demount/keep criteria are satisfied. As mentioned above, the demount/keep criteria limits the number of concurrently idle storage media to the predetermined maximum (set in step 401), and also demounts any storage media that have been idle for a prescribed maximum time (also set in step 401). If the demount/keep criteria are already satisfied, step 506 advances to step 514, ending the routine 500. In this case, the decision of step 406 (FIG. 4) will result in no demounts, and progress to step 408.

Otherwise, if the demount/keep criteria are not satisfied, step 506 advances to step 507, which ranks the presently mounted, idle storage media according to mount time. Then, step 508 considers the demounting of the media with the longest idle time. If demounting of this media will satisfy the demount/keep criteria, this medium is slated for demounting and step 510 advances to step 514, ending the routine 500. Otherwise, if the criteria is not satisfied, step 510 advances to step 512, which considers the additional demounting of the idle storage media with the next-longest idle time. Idle storage media are repeatedly considered by steps 510, 512 until the demount/keep decision is satisfied, ultimately concluding the routine 500 in step 514.

Demount/Keep Analysis-Another Example

Figure 6:
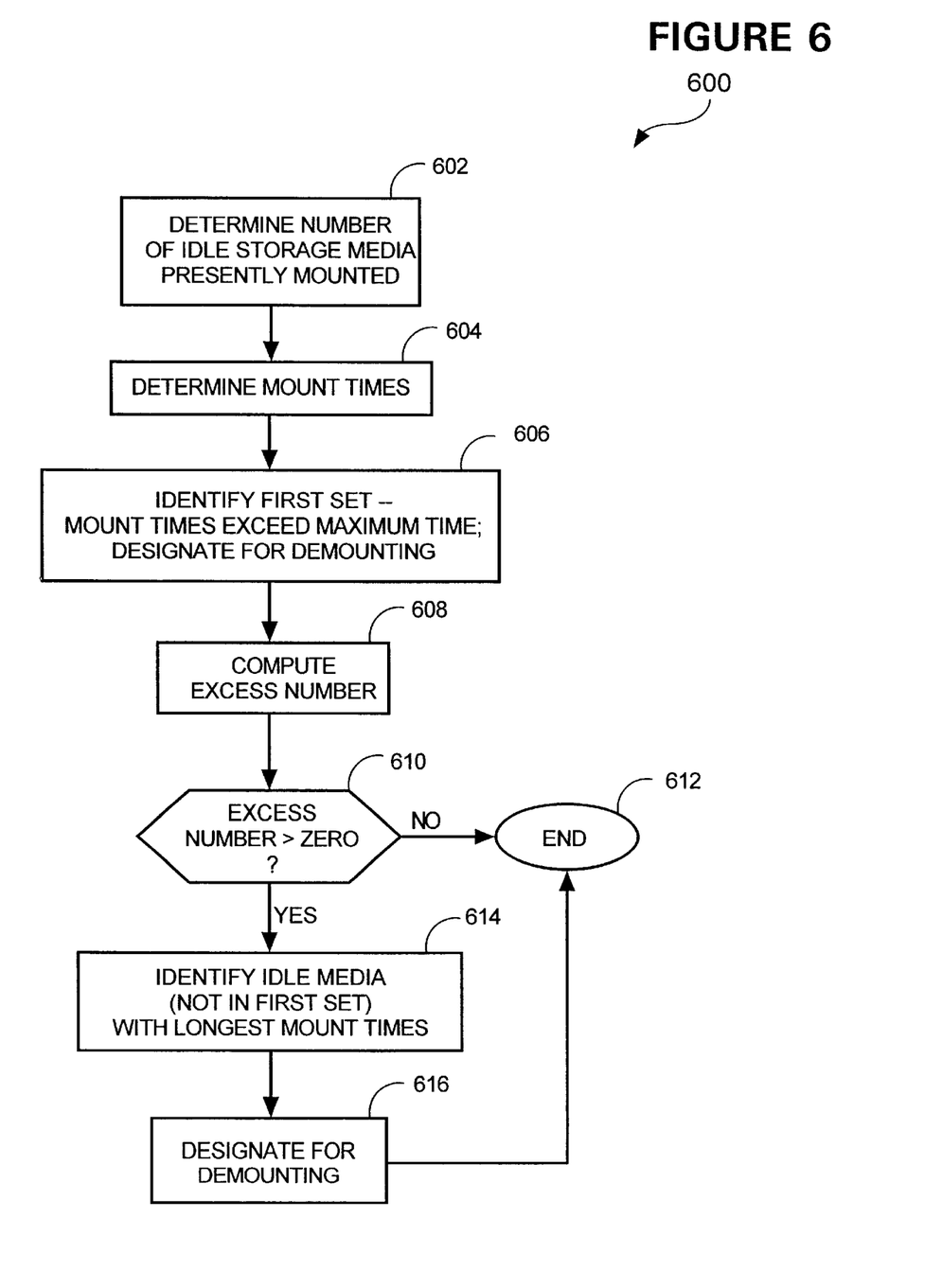
FIG. 6 is a detailed flowchart of an alternative sequence for analyzing removable backup storage media according to the invention.

As shown in FIG. 6, the sequence 600 provides an alternative to the iterative approach illustrated in the routine 500. In the sequence 600, idle storage media are identified for demounting in aggregate. Steps 602, 604 determine the number of presently mounted idle storage media, and the mount times of each presently mounted, idle storage medium. Next, step 606 identifies a first set of storage media including all presently mounted, idle storage media whose idle times exceed the prescribed maximum time (per initialization step 401, FIG. 4).

In step 608, the storage manager 106 computes an "excess number" by taking the number of presently mounted idle storage media, reducing this number by the number of media in the first set (from step 606), and further reducing this number by the prescribed maximum number of currently mounted idle storage media (from initialization step 401). Step 610 then considers whether this number is greater than zero. If not, this means that the number of presently mounted, idle storage media will not exceed the prescribed maximum number after the first set of media (from step 606) are demounted. In this case, step 610 progresses to step 612, where the routine 600 ends.

Otherwise, if the excess number is greater than zero, then the number of presently mounted, idle storage media will still exceed the prescribed maximum number even after the first set of media (identified in step 606) are demounted. Therefore, additional media must be identified for demounting. In this case, the storage manager 106 identifies an additional group of presently mounted idle storage media, not in the first set, with the longest idle times (step 614). The number of media in the additional group is equal to the excess number from step 608. After step 614, the storage manager 106 designates the media in the additional group for demounting (step 616) and then the routine ends in step 612.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for managing removable storage media in a data storage system including multiple media drives, comprising operations of:

initializing the data storage system, including:

establishing a maximum permitted number of concurrently mounted idle storage media;

establishing a maximum permitted length of time for leaving storage media mounted while idle;

analyzing storage media mounted to the media drives, including:

determining how many idle storage media are mounted to the drives;

determining idle times of mounted idle storage media;

identifying for demounting any idle storage media, mounted to the drives, with the greatest idle times whose demounting would be needed to reduce a count of mounted idle storage media to the maximum permitted number and eliminate any mounted idle storage media with idle times exceeding the maximum permitted length of time; and if any storage media are identified, demounting the identified storage media.

2. The method of claim 1, the initializing operation further comprising:

defining conditions for storage media to qualify as idle, such that a data storage medium is idle when the medium is mounted to a media drive and experiences less than a prescribed level of read/write activity by the media drive.

3. The method of claim 1, the initializing operation further comprising:

defining conditions for storage media to qualify as idle, such that a data storage medium is idle when the medium is mounted to a media drive and experiences less than a prescribed level of read/write activity by the media drive, and no data access requests are pending for that data storage medium.

4. The method of claim 1, the operations further comprising:

adjusting initialized parameters, including the maximum permitted number and the maximum permitted length of time.

5. The method of claim 1, the identifying operation comprising:

designating a first set including any presently mounted idle storage media with idle times exceeding the maximum permitted length of time;

computing an excess number equal to a count of presently mounted idle storage media reduced by a count of the first set and further reduced by the maximum permitted number;

if the excess number exceeds zero, identifying for demounting the excess number of presently mounted idle storage media other than the first set having the longest idle times.

6. The method of claim 1, the identifying operations comprising:

identifying for demounting any presently mounted idle storage media whose idle times exceed the maximum permitted length of time;

as long as a count of mounted idle storage media exceeds the maximum permitted number, repeatedly a different mounted idle storage medium with the longest idle time and identifying the selected storage medium for demounting.

7. The method of claim 1, the operations further comprising:

after the initializing operation, receiving adjustment to at least one of the maximum permitted number and the maximum permitted length of time.

8. The method of claim 1, the operations further comprising:

re-initializing the backup system, comprising adjusting at least one of the maximum permitted number and the maximum permitted length of time.

9. The method of claim 1, the operations further comprising:

prior to the demounting operation, un-identifying one or more mounted idle storage media with idle times exceeding the maximum permitted length of time, and in their place, identifying for demounting a corresponding number of mounted idle storage media with idle times that do not exceed the maximum permitted length of time and with a comparatively lesser amount of data stored thereon.

10. The method of claim 1, the demounting operation including a swap operation comprising:

retaining mounted idle storage media with idle times exceeding the maximum permitted length of time and instead demounting a corresponding number of mounted idle storage media with a comparatively lesser amount of data stored thereon, and logically interchanging idle times of the retained and demounted storage media.

11. A signal-bearing medium tangibly embodying a program of machine-readable instructions executable by a digital processing apparatus to perform operations for managing removable storage media in a data storage system including multiple media drives, the operations comprising:

initializing the data storage system, including:

establishing a maximum permitted number of concurrently mounted idle storage media;

establishing a maximum permitted length of time for leaving storage media mounted while idle;

analyzing storage media mounted to the media drives, including:

determining how many idle storage media are mounted to the drives;

determining idle times of mounted idle storage media;

identifying for demounting any idle storage media, mounted to the drives, with the greatest idle times whose demounting would be needed to reduce a count of mounted idle storage media to the maximum permitted number and eliminate any mounted idle storage media with idle times exceeding the maximum permitted length of time; and any storage media are identified, demounting the identified storage media.

12. The medium of claim 11, the initializing operation further comprising:

defining conditions for storage media to qualify as idle, such that a data storage medium is idle state when the medium is mounted to a media drive and experiences less than a prescribed level of read/write activity by the media drive.

13. The medium of claim 11, the initialization operation further comprising:

defining conditions for storage media to qualify as idle, such that a data storage medium is idle state when the medium is mounted to a media drive and experiences less than a prescribed level of read/write activity by the media drive, and no data access requests are pending for that data storage medium.

14. The medium of claim 11, the operations further comprising:

adjusting initialized parameters, including the maximum permitted number and the maximum permitted length of time.

15. The medium of claim 11, the identifying operation comprising:

designating a first set including any presently mounted idle storage media with idle times exceeding the maximum permitted length of time;

computing an excess number equal to a count of presently mounted idle storage media reduced by a count of the first set and further reduced by the maximum permitted number;

if the excess number exceeds zero, identifying for demounting the excess number of presently mounted idle storage media other than the first set having the longest idle times.

16. The medium of claim 11, the identifying operations comprising:

identifying for demounting any presently mounted idle storage media whose idle times exceed the maximum permitted length of time;

as long as a count of mounted idle storage media exceeds the maximum permitted number, repeatedly selecting a different mounted idle storage medium with the longest idle time and identifying the selected storage medium for demounting.

17. The medium of claim 11, the operations further comprising:

after the initializing operation, receiving adjustment to at least one of the maximum permitted number and the maximum permitted length of time.

18. The medium of claim 11, the operations further comprising:

re-initializing the backup system, comprising adjusting at least one of the maximum permitted number and the maximum permitted length of time.

19. The medium of claim 11, the operations further comprising:

prior to the demounting operation, un-identifying one or more mounted idle storage media with idle times exceeding the maximum permitted length of time, and in their place, identifying for demounting a corresponding number of mounted idle storage media with idle times that do not exceed the maximum permitted length of time and with a comparatively lesser amount of data stored thereon.

20. The medium of claim 11, the demounting operation including a swap operation comprising:

retaining mounted idle storage media with idle times exceeding the maximum permitted length of time and instead demounting a corresponding number of mounted idle storage media with a comparatively lesser amount of data stored thereon, and logically interchanging idle times of the retained and demounted storage media.

21. A logic circuit of multiple interconnected electrically conductive elements configured to perform operations to manage removable storage media in a data storage system including multiple media drives, the operations comprising:

initializing the data storage system, including:
establishing a maximum permitted number of concurrently mounted idle storage media;
establishing a maximum permitted time for leaving storage media mounted while idle;

analyzing storage media mounted to the media drives, including:
determining how many storage media are mounted to the drives;
determining idle times of mounted idle storage media;

identifying for demounting any idle storage media, mounted to the drives, with the greatest idle times whose demounting would be needed to reduce a count of mounted storage media to the maximum permitted number and eliminate any mounted storage media with idle times exceeding the maximum permitted length of time; and if any storage media are identified, demounting the identified storage media.

22. A data storage subsystem, comprising:

multiple removable media read/write drives;

media mount/demount equipment; and a storage manager coupled to the drives and the mount/demount equipment, programmed to manage removable storage media by performing operations comprising:

initializing the data storage system, including:
establishing a maximum permitted number of concurrently mounted idle storage media;
establishing a maximum permitted length of time for leaving storage media mounted while idle;

analyzing storage media mounted to the media drives, including:
determining how many idle storage media are mounted to the drives;
determining idle times of mounted idle storage media;

identifying for demounting any idle storage media, mounted to the drives, with the greatest idle times whose demounting would be needed to reduce a count of mounted idle storage media to the maximum permitted number and eliminate any mounted idle storage media with idle times exceeding the maximum permitted length of time; and if any storage media are identified directing the mount/demount equipment to demount the identified storage media.

23. A data storage subsystem, comprising:

multiple drive means for conducting read/write operations to multiple data storage media;

mount/demount means for mounting and demounting data storage media to/from the drive means; and managing means coupled to the drive means and the mount/demount means for managing removable data storage media by:
- initializing the data storage system, including:
  - establishing a maximum permitted number of concurrently mounted idle storage media;
  - establishing a maximum permitted length of time for leaving storage media mounted while idle;
- analyzing storage media mounted to the drive means, including:
  - determining how many idle storage media are mounted to the drives;
  - determining idle times of mounted idle storage media;
- identifying for demounting any idle storage media, mounted to the drives, with the greatest idle times whose demounting would be needed to reduce a count of mounted idle storage media to the maximum permitted number and eliminate any mounted idle storage media with idle times exceeding the maximum permitted length of time; and
- if any storage media are identified, directing the mount/demount means to demount the identified storage media.

* * * * *

UNITED STATES PATENT AND TRADEMARK OFFICE
CERTIFICATE OF CORRECTION

PATENT NO. : 6,446,160 B1
DATED : September 3, 2002
INVENTOR(S) : Cuong Minh Le et al.

It is certified that error appears in the above-identified patent and that said Letters Patent is hereby corrected as shown below:

<u>Title page,</u>
Item [57], ABSTRACT,
Line 3, delete "than" between "and" and "selectively demounted" and replace with -- then --.
Line 19, delete duplicative period "." at end of sentence following "length of time".

<u>Column 4,</u>
Line 64, insert a hard return creating a new paragraph after "apparatus 200." and before "Despite the specific".

<u>Column 10,</u>
Line 18, insert -- selecting -- between "repeatedly" and "a different".

<u>Column 11,</u>
Line 8, insert -- if -- before "any storage media".
Lines 13 and 20, delete "state" between "idle" and "when the".

Signed and Sealed this

Seventeenth Day of June, 2003

JAMES E. ROGAN
*Director of the United States Patent and Trademark Office*